Figure 1:
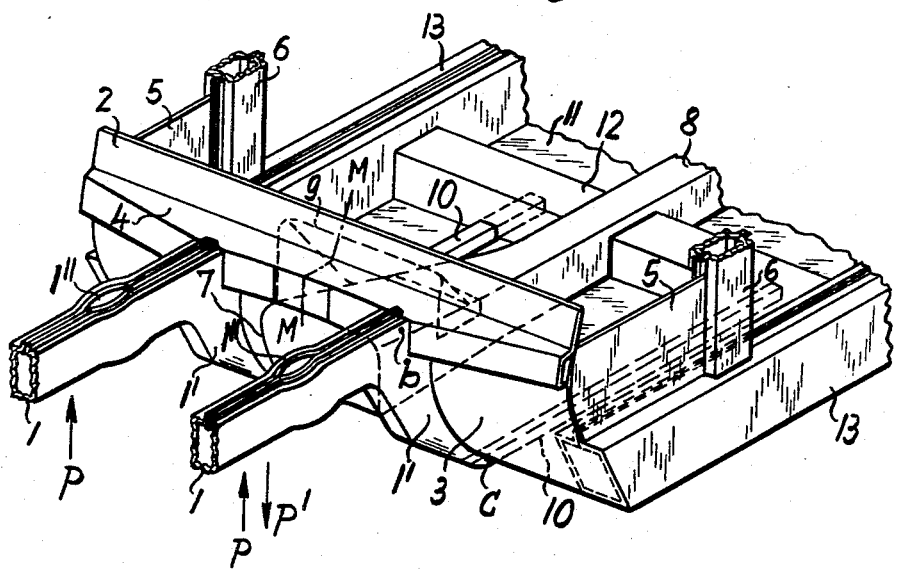

May 23, 1967  J. MÜLLER ETAL  3,321,235
BOTTOM FRAME FOR AUTOMOBILES
Filed Oct. 19, 1964

INVENTORS
JOSEF MÜLLER
LUDWIG KRAUS
BY Dicke + Craig
ATTORNEYS

United States Patent Office 3,321,235
Patented May 23, 1967

3,321,235
BOTTOM FRAME FOR AUTOMOBILES
Josef Müller, Stuttgart-Riedenberg, and Ludwig Kraus, Wettstetten, near Ingolstadt, Germany, assignors to Daimler-Benz Aktiengesellschaft, Stuttgart-Untertürkheim, Germany
Filed Oct. 19, 1964, Ser. No. 404,892
3 Claims. (Cl. 296—28)

The present invention relates to a new bottom frame structure for automobiles which is superior to similar frame structures such as were previously designed.

In the conventional types of bottom frame structures in which the central longitudinal frame member was provided with a bifurcated forward extension, the connection between the rear fork ends to the bottom structure had a relatively low resistance to torsional and bending stresses, whereas the forces coming from the front axle suspension were transmitted to the bottom frame structure by the ends of the fork. These frame structures therefore required that the bifurcated extension of the central longitudinal frame member up to the cross member for supporting the front seats be made of a very sturdy construction. This, in turn, meant that the distance between the bottom of the vehicle and the ground had to be made relatively large.

Since it is, however, the modern trend in automobile designs to build the cars as low as possible, it is desirable also to reduce the distance between the floorboard and the ground as much as possible so as to permit the installation of comfortable seats and to attain sufficient overhead space for the passengers at the inside of the car.

This object is attained according to the present invention by providing an especially suitable combination of a frame, the bottom part of the dashboard, and the vehicle bottom. This inventive combination has the additional advantages of reducing the weight of the car and of increasing the rigidity of its front part.

According to the invention, the two forward extensions of the central longitudinal frame member which form a supporting fork for the front axle suspension are made of an elongated rectangular cross section, the longer walls of which extend substantially vertically. Immediately in front of the pedal wall or pedal bottom which also forms a lower part of the dashboard, this rectangular section merges into a cross-sectional shape which has practically the same height as the pedal wall. At their rear ends, the two longitudinal extensions are supported on a cross member which together with the pedal wall is secured to two side wall portions which are secured to the front post of the car body and centrally to the box-shaped central longitudinal frame member, the upper side of which is obliquely inclined relative to the vehicle bottom. The lower rear ends of the two longitudinal extensions merge into two longitudinal frame members which are located above the vehicle bottom and extend up to a cross member which supports the front seats and is located behind the front posts. This cross member extends through the central longitudinal frame member and its ends are connected to the outer longitudinal frame members of the bottom frame from which the front posts project and the front ends of which are connected to the lower edge of the side wall of the car body and to the pedal wall.

The features and advantages of the present invention will become more clearly apparent from the following detailed description thereof which is to be read with reference to the accompanying drawings, in which—

Figure 2:
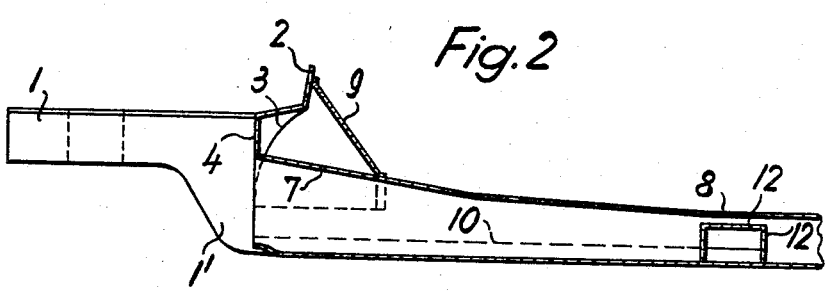

FIGURE 1 shows a perspective view of the front part of a bottom frame of an automobile; while FIGURE 2 shows a central longitudinal section of the frame part according to FIGURE 1.

In the drawings, the two forward extensions of the central longitudinal frame member 8 which form the bifurcated support for the front-axle suspension are indicated at 1, the lower part of the dashboard at 2, and the pedal wall at 3. The frame extensions 1 have a fully closed rectangular cross section, the wider walls of which extend vertically and increase in height in the downward direction of 1' in front of the pedal wall 3 so as to have at this point the same height as the latter. The rear upper ends of the frame extensions 1 are supported by a cross member 4 the outer ends of which are connected to a pair of side wall portions 5, each of which is secured to the associated front post 6 of the car body. The pedal wall 3 is further connected to the front end of the obliquely inclined and enlarged part of the tunnel-shaped central longitudinal frame member 8. This front end also carries a hood 9 which supports the lower dashboard section 2.

The lower rear ends of the two frame extensions 1 merge into low narrow auxiliary longitudinal frame members 10 which are supported on the floor-board 11 and extend into, and are rigidly secured to, the upright walls of a front-seat supporting cross member 12 which is located behind the front post 6 of the car body. This cross member 12 consists either of two sections or it extends through the central longitudinal member. Its lateral ends are connected to the outer box-shaped longitudinal frame members 13, the front ends of which are secured to the side wall portions 5 and to the pedal wall 3.

FIGURE 1 shows clearly the very low height of the frame structure according to the invention which, however, is extremely resistant to pending and distortion. The forces P coming from the front axle tend to turn the frame extensions 1, for example, about a transverse axis extending through the point $b$, while the cross member 4 is acted upon by forces which are essentially directed toward the rear. At the same time, at the point $c$ forwardly directed longitudinal forces occur which are primarily transmitted by the narrow frame members 10 to the floorboard 1 which is very rigid in this direction. Since it is the principal purpose of the frame members 10 only to prevent the floorboard 1 from buckling, they may be made of a very low solidity which merely has to be strong enough to prevent these frame members from being distorted by occasional slight contacts with the ground. Their height may, for example, amount to only one third of the height of the frame members as were required at these points in previous frame structures. Consequently, the floorboard 11 may be lowered by a corresponding amount which, in turn, increases the height of the interior of the car.

The cross member 4 is centrally rigidly supported within the area adjacent to the line M—M by the double inclined walls 7, 9 of the longitudinal frame member 8. When the forces are exerted as described above, only bending stresses occur in the cross member 4 which reach a maximum at the point $b$, whereas in the area adjacent to the line M—M and at the points of connection to the side wall portions 5 the bending stresses are zero. The forces acting upon the cross member 4 are at least partly transmitted by these side wall portions 5 to the frame members 13 so that bending stresses are exerted thereon.

If torsional stresses are exerted upon the front part of the frame, a force couple P, P' may act thereon which tends to bend the cross member 4 at the point $b$ at one side of the vehicle toward the rear and at the other side of the vehicle toward the front. A tangent to the reversing point then occurs at the area of the line M—M. If the forces P and P' are equal, the torsional moments at the point $b$ have the same size as in the case previously mentioned. The forces are then again taken up as in the previous case by the outer longitudinal frame members 13 through the inclined parts 7, 9 and the side wall portions 5. The cross member 4 must therefore be securely connected by the side wall portions 5 to the longitudinal frame members 13 so that the forces will be easily and reliably transmitted from the cross member 4 to the longitudinal members 13.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed out invention, what we claim is:

1. A bottom frame structure for an automobile comprising a floorboard, a tunnel-shaped central longitudinal frame member and outer longitudinal frame members extending along the upper side of said floorboard, a dashboard, a pedal wall connected to the lower part of said dashboard, a pair of front posts for supporting the car body, a pair of side wall parts connected to said front posts, said side wall parts and said posts being secured to said outer longitudinal frame members, a pair of forward extensions operatively connected to said central longitudinal frame member and forming a supporting fork for the front axle suspension and having an elongated rectangular cross section comprising walls of different widths, the walls of greater width of said extensions extending substantially vertically and increasing immediately in front of said pedal wall to a height substantially equal to that of said pedal wall, a first cross member, the upper rear ends of said extensions being supported on said first cross member, said first cross member together with said pedal wall being secured to said two side wall parts and centrally to said central longitudinal frame member which is conically tapered relative to said floorboard, a second cross member on the upper side of said floorboard behind said front posts for supporting the front-seat of the automobile, and a pair of auxiliary longitudinal frame members between said central and outer longitudinal frame members and extending along the upper side of said floorboard up to said second cross member.

2. A bottom frame structure as defined in claim 1, further comprising an obliquely inclined hood having a lower portion supported on said central longitudinal frame member and an upper portion connected to said pedal wall and above the latter to the lower part of said dashboard.

3. A bottom frame structure as defined in claim 1, wherein said first cross member located at the level of the upper part of said pedal wall increases in width from its outer ends toward its points of connection to said extensions.

References Cited by the Examiner

UNITED STATES PATENTS

| | | | |
|---|---|---|---|
| 2,669,462 | 2/1954 | Toncray et al. | 296—106 |
| 3,108,836 | 10/1963 | Deckert | 296—28 |
| 3,202,451 | 8/1965 | Auger et al. | 296—28 |

BENJAMIN HERSH, *Primary Examiner.*

J. A. PEKAR, *Assistant Examiner.*